United States Patent
Oosawa

[19]
[11] Patent Number: 6,151,408
[45] Date of Patent: *Nov. 21, 2000

[54] METHOD FOR SEPARATING A DESIRED PATTERN REGION FROM A COLOR IMAGE

[75] Inventor: Akira Oosawa, Kanagawa-ken, Japan

[73] Assignee: Fuji Photo Film Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/598,976

[22] Filed: Feb. 9, 1996

[30] Foreign Application Priority Data

Feb. 10, 1995 [JP] Japan ................................. 7-022909

[51] Int. Cl.[7] ................................ G06K 9/00; G06K 9/34
[52] U.S. Cl. ........................... 382/164; 382/156; 382/282
[58] Field of Search ..................................... 382/162, 164, 382/156, 157, 155, 159, 173, 165, 166, 167, 282; 395/20, 21, 22, 23; 706/20; 358/520, 453, 530

[56] References Cited

U.S. PATENT DOCUMENTS

| | | | |
|---|---|---|---|
| 5,134,667 | 7/1992 | Suzuki | 382/164 |
| 5,249,259 | 9/1993 | Harvey | 395/23 |
| 5,327,228 | 7/1994 | Satyanarayana et al. | 348/647 |
| 5,446,543 | 8/1995 | Nakagawa et al. | 358/518 |
| 5,497,430 | 3/1996 | Sadovnik et al. | 382/156 |

FOREIGN PATENT DOCUMENTS 3-99379  4/1991  Japan ............................. G06F 15/70

OTHER PUBLICATIONS

"Face Position Matching Method Using Color Information for Face Image Recognition" by Sasaki, Akamatsu, and Suenaga, Shingiho, IE91–2, 1989.

"Neuronal Networks in Early Vision" by C. Koch, J. Marroquin, and A. Yuiie, Anaklog, Proc. Natl. Acad. Sci. USA, vol. 83, pp. 4263–4267, Jun. 1986.

"Contour Line Extraction with a Learning Function" by Hong, Kawahito, et al., Collected Papers of The Institute of Electronics and Communication Engineers of Japan, D–II, vol. J74–D–II, No. 3, pp. 348–356, Mar., 1991.

*Primary Examiner*—Amelia Au
*Assistant Examiner*—Timothy M. Johnson
*Attorney, Agent, or Firm*—Sughrue, Mion, Zinn, Macpeak & Seas, PLLC

[57] ABSTRACT

In a method for separating a desired color region from a color image, color component values, which represent color components of the image, are calculated. Energy minimization is then carried out, in which calculations of an update rule for minimizing energy are iterated, in accordance with an energy function, which is defined by the color component values and a line process representing the presence or absence of continuity of the color component values in the image. A contour of the color region, which contour is represented by the line process and obtained from the energy minimization, is then extracted. The desired color region is thereby separated accurately from the color image without being affected by a background in the image.

1 Claim, 7 Drawing Sheets

$E_P = 0, E_C = C_C, E_L = 2C_L$ $E_P = 0, E_C = C_C, E_L = C_L$ $E_P = C_P, E_C = C_C, E_L = 2C_L$ $E_P = 0, E_C = 2C_C, E_L = 10C_L$

IMAGE 1

IMAGE 2

IMAGE 3

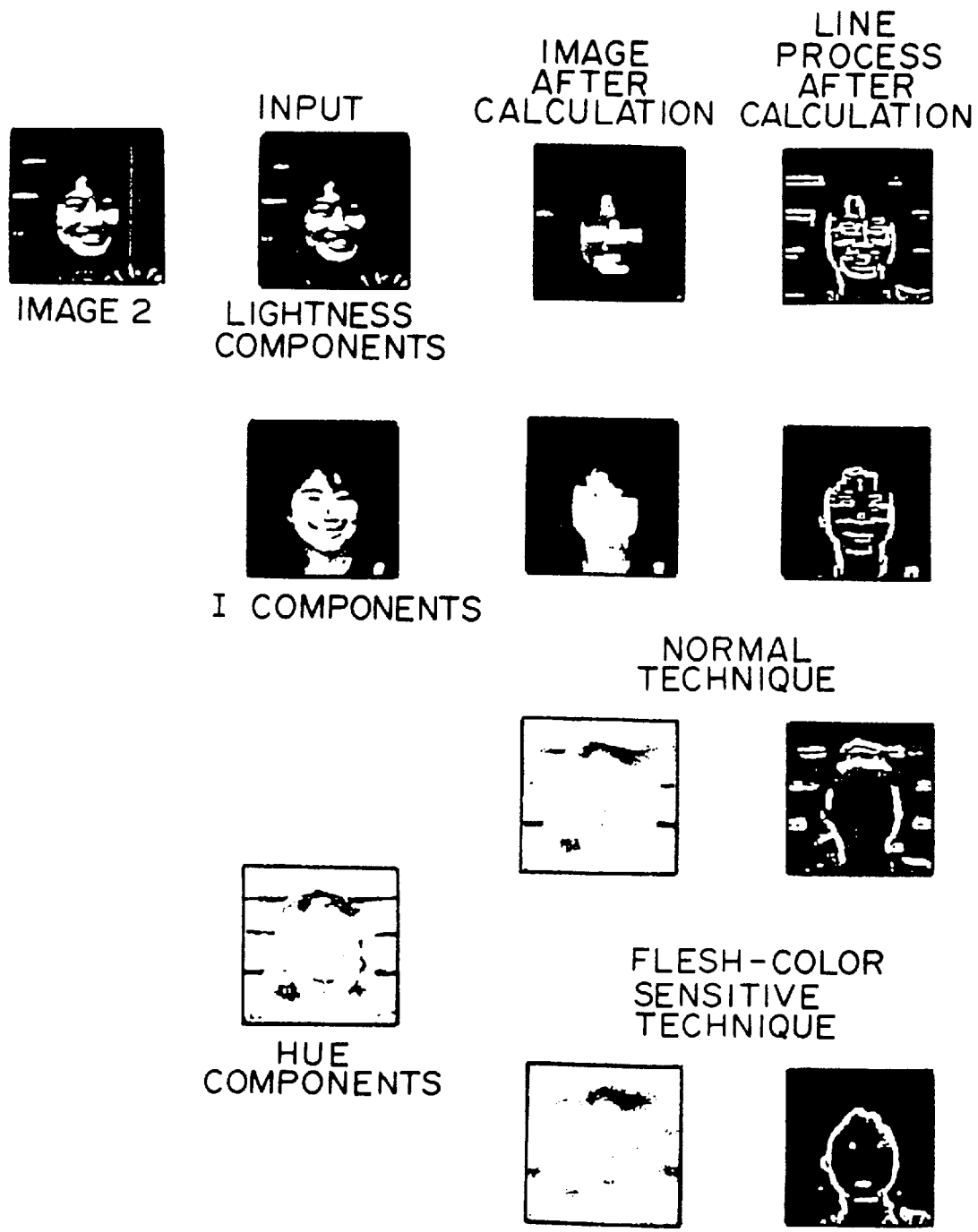
F I G. 6B

METHOD FOR SEPARATING A DESIRED PATTERN REGION FROM A COLOR IMAGE

BACKGROUND OF THE INVENTION

1. Field of the Invention

This invention relates to a method for separating a color region from an image. This invention particularly relates to a method for separating a color region, which is constituted of same-color components in a color image, from the color image.

2. Description of the Prior Art

There have heretofore been proposed various methods for extracting a face pattern region from an image, in which the face pattern is embedded, or for recognizing whether an extracted region is or is not a face pattern. For example, a method for recognizing a face pattern in a color image is proposed in "Face Position Matching Method Using Color Information for Face Image Recognition" by Sasaki, Akamatsu, and Suenaga, Singiho, IE91-2, 1989. With the proposed method, a color image is converted to the YIQ base or the HVS base, and a region of flesh color, which is the color of a face, in the image is taken as a face pattern region. Also, reference points are set at eye patterns, a mouth pattern, and the like, in the face pattern region, and the face pattern is recognized from the relationship among the reference points.

Also, neural networks using a line process, which is an early vision model, has been proposed in, for example, "Neuroral Networks in Early Vision" by C. Koch, J. Marroquin, and A. Yuiie, Anaklog, Proc. Natl. Acad. Sci. U.S.A., Vol. 83, pp. 4263–4267, June 1986. With the neural networks using the line process, without high-level knowledge being used, a function, which is referred to as the line process and represents the presence or absence of discontinuity between a continuous value and an adjacent continuous value, is applied to neural networks, and an energy function for estimating a situation of the maximum posterior probability is obtained. Also, the minimum value of energy is calculated, and the presence or absence of continuity or discontinuity of a distribution of certain values is detected.

Further, an image processing apparatus utilizing the method with the line process of Koch, et al. has been proposed in, for example, Japanese Unexamined Patent Publication No. 3(1991)-99379. In the proposed image processing apparatus, a plurality of local area limited probability fields, which have different levels of resolution, and information representing the positions and shapes of feature points are located in a layer pattern, and interactions between the respective layers is utilized. In this manner, the proposed image processing apparatus is provided with a function for restoring an image having good image quality and a contour line extracting function, which reflect general information.

Specifically, in the proposed image processing apparatus, a plurality of layers are located, which extract a plurality of the local area limited probability fields, that have different levels of resolution, and information representing the positions and shapes of the feature points. Also, interactions between a many-valued stochastic variable, which represents the gray level values of the image, and a binary stochastic variable, which represents the presence or absence of discontinuity of the gray level values in the image, are utilized. Image processing is carried out by using general information between the respective layers. In this manner, image processing, such as restoration of an image having good image quality and contour line extraction, is carried out such that the general information may be reflected.

Furthermore, a method for extracting a contour line in an image by using the line process has been proposed in, for example, "Contour Line Extraction with a Local Parallel Probability Algorithm Having an Energy Learning Function" by Hongo, Kawahito, et al., Collected Papers of The Institute of Electronics and Communication Engineers of Japan, D-II, Vol. J74-D-II, No. 3, pp. 348–356, March 1991. With the proposed method, the technique using the line process, which is proposed by Koch, et al., is utilized for a black-and-white image, in which a face pattern is embedded. Specifically, an energy function is used, which is defined by density values of the image and the line process representing the presence or absence of continuity of the density values. A calculation is made to find the minimum value of energy, which is represented by the energy function, and a contour of the face pattern embedded in the black-and-white image is thereby extracted. This technique is characterized by an energy learning function for determining the parameters of the energy function through learning operations.

However, the method proposed by Sasaki, et al. is applicable only to limited kinds of images, in which no background is present, a face pattern is located in the vicinity of the center point of the image, and no spectacle pattern is present. Thus with the proposed method, a face pattern cannot be recognized or extracted regardless of the kind of image.

Also, the method proposed by Koch, et al., the method described in Japanese Unexamined Patent Publication No. 3(1991)-99379, and the method proposed by Hongo, et al. are applicable only to the extraction of a face contour from a gray level image. The proposed methods have the drawbacks in that, in cases where they are used for an image having a background or an image having a pattern of color similar to the face color around the face pattern, the background or the pattern around the face pattern becomes amalgamated with the contour of the face pattern, and the contour of the face pattern does not close. Therefore, with the proposed methods, the face pattern cannot be separated accurately from the image.

SUMMARY OF THE INVENTION

The primary object of the present invention is to provide a method for separating a color region, which is not affected by a background in an image and with which a color region constituted of color components of flesh color, which is the color of a face, or the like, is separated accurately from the image.

Another object of the present invention is to provide a method for separating a color region, wherein a desired color region is separated accurately from an image, in which a pattern of color similar to the color of the color region is present around the color region.

The specific object of the present invention is to provide a method for separating a color region, which is capable of being carried out with a simple apparatus.

The present invention provides a method for separating a color region, in which a desired color region is separated from a color image, comprising the steps of:

i) calculating color component values, which represent color components of the image, ii) carrying out energy minimization, in which calculations of an update rule for minimizing energy are iterated, in accordance with an energy function, which is defined by the color component values and a line process representing the presence or absence of continuity of the color component values in the image, iii) extracting a contour of the color region, which contour is represented by the line process and obtained from the energy minimization, and iv) thereby separating the desired color region from the color image.

The method for separating a color region in accordance with the present invention should preferably be modified such that non-linear processing for emphasizing color components of color of the desired color region in the image may be carried out on the color component values, and the energy minimization is carried out on an image, which is obtained from the non-linear processing.

In such cases, the non-linear processing should preferably be carried out in accordance with a sigmoid function for emphasizing the color components of color of the desired color region.

With the method for separating a color region in accordance with the present invention, the energy function is defined by the color component values, which represent the color components of the color image, and the line process, which represents the presence or absence of continuity of the color component values. Also, the energy minimization, in which the calculations of the update rule for minimizing energy are iterated, is carried out in accordance with the energy function. As a result, the line process appears with a value at a portion, at which the color components become discontinuous in the color image. The line process appearing with the value represents a contour, which represents a boundary between color regions in the image. Therefore, by the iteration of the calculations of the update rule for minimizing energy, discontinuity between the desired color region and the other color region appears clearly as a contour. Accordingly, the desired color region can be accurately separated from the image without any high-level knowledge being used.

Also, with the method for separating a color region in accordance with the present invention, wherein the non-linear processing for emphasizing the color components of color of the desired color region is carried out on the image and the energy learning operation is thereafter carried out, the desired color region can be emphasized. Therefore, discontinuity between the desired color region and the other color region appears more clearly, and the accuracy, with which the color region is separated, can be kept high. In such cases, even if a background is present in the image or a pattern of color, which is similar to the color of the desired color region, is present around the desired color region in the image, the desired color region can be separated accurately from the image.

Further, with the method for separating a color region in accordance with the present invention, wherein the non-linear processing for emphasizing the color components of color of the desired color region is carried out in accordance with the sigmoid function, the processing for emphasizing the desired color region can be carried out comparatively easily. Therefore, the method for separating a color region in accordance with the present invention can be carried out with a simple apparatus.

BRIEF DESCRIPTION OF THE DRAWINGS

FIG. 6B is an explanatory view showing the results of calculations, which are obtained when an image 2 is taken as an input image.

DESCRIPTION OF THE PREFERRED EMBODIMENTS

The present invention will hereinbelow be described in further detail with reference to the accompanying drawings.

Figure 1:
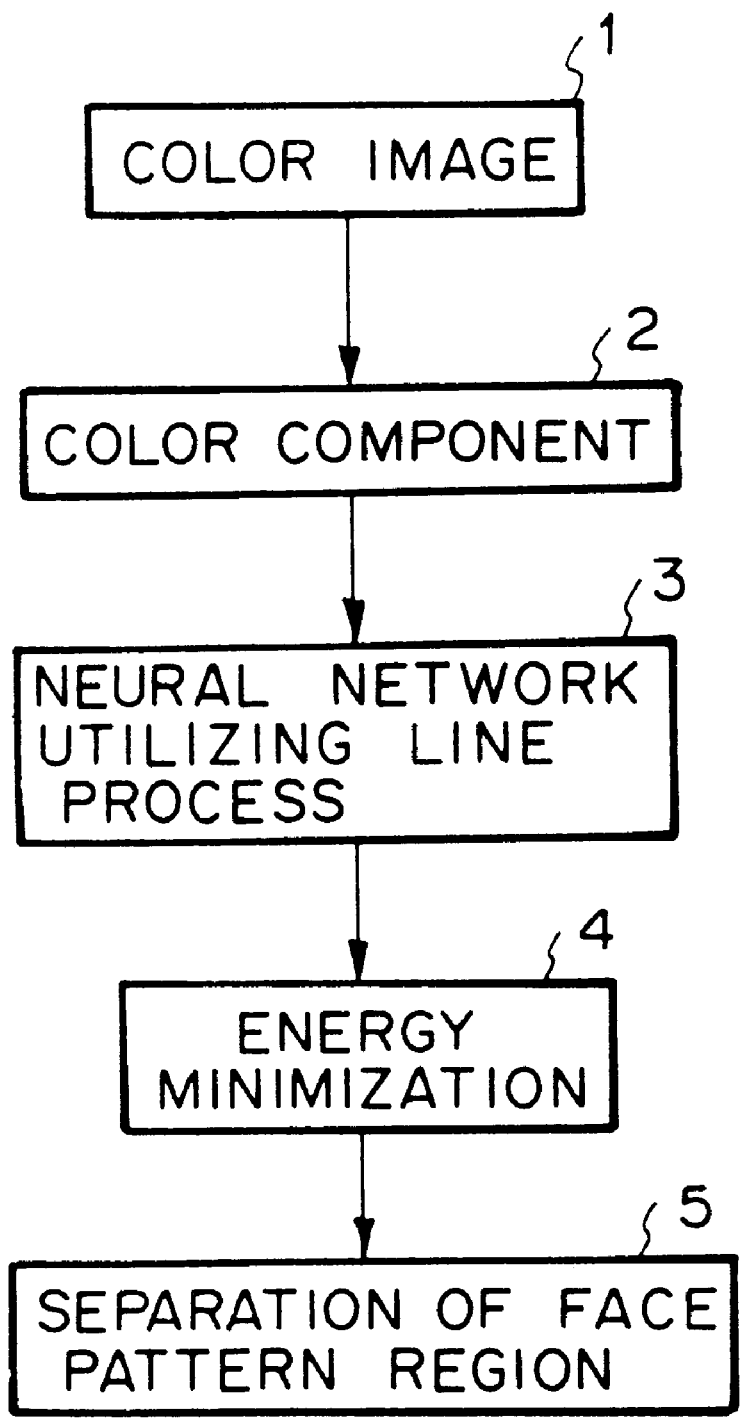
FIG. 1 is a flow chart showing an embodiment of the method for separating a color region in accordance with the present invention.

FIG. 1 is a flow chart showing an embodiment of the method for separating a color region in accordance with the present invention. In this embodiment, a color region of flesh color, which is the color of a face, is separated from a color image.

As illustrated in FIG. 1, in the embodiment of the method for separating a color region in accordance with the present invention, in a step 1, a color image is presented to an apparatus for carrying out the method. In a step 2, color component values of the presented color image are calculated. Thereafter, in a step 3, the information representing the color component values, which have been calculated in the step 2, is fed into a neural network, which utilizes the line process representing the presence or absence of continuity of the color component values in the presented color image. In a step 4, with the neural network, energy minimization, in which the calculations of the update rule for minimizing energy are iterated, is carried out in accordance with an energy function, which is defined by the color component values and the line process. Also, in a step 5, a contour of a color region, which is surrounded by line processes obtained from the energy minimization, is extracted, and a face pattern region is thereby separated from the color image. The color image presented in the step 1 is constituted of a plurality of picture elements, and the picture element values of the respective picture elements are taken as the color component values.

How the processing is carried out in the embodiment of the method for separating a color region in accordance with the present invention will be described hereinbelow.

Firstly, how the color component values are calculated in the step 2 from the color image, which is presented in the step 1.

The color image contains red (R), green (G), and blue (B), which are the three primary colors. Such that a region of flesh color, which is the color of a face, can be separated easily from the color image, the color image is converted to the YIQ base. The conversion to the YIQ base is carried out with Formula (1).

$$\begin{bmatrix} I \\ Q \\ Y \end{bmatrix} = \begin{bmatrix} 0.60 & -0.28 & -0.32 \\ 0.21 & -0.52 & 0.31 \\ 0.30 & 0.59 & 0.11 \end{bmatrix} \begin{bmatrix} R \\ G \\ B \end{bmatrix} \quad (1)$$

As for the image having been converted to the YIQ base, the I components have a clear peak with respect to the flesh-color region. Therefore, in the step 3, the I components having been obtained from the conversion to the YIQ base are fed into the neural network utilizing the line process.

Alternatively, in the method for separating a color region in accordance with the present invention, the color image may be converted to the HVS base, which is composed of the value of color (or the lightness), the saturation, and the hue. The H components, which are the hue components obtained from the conversion to the HVS base, may be fed into the neural network. The conversion to the HVS base is carried out with Formula (2).

1) $V:=\max(R, G, B)$

2) Let $X:=\min(R, G, B)$

3) $S:=(V-X)/V$

4) Let $r:=(V-R)/(V-X)$ $g:=(V-G)/(V-X)$ $b:=(V-B)/(V-X)$ 5) if $R=V$ then $H:=$(if $G=X$ then $5+b$ else $1-g$)

if $G=V$ then $H:=$(if $B=X$ then $1+r$ else $3-b$)

else $H:=$(if $R=X$ then $3+g$ else $5+r$)

6) $H=H/6$ \quad (2)

Formula (2) represents a HEXCONE model. The H components, which are the hue components, are calculated by dividing a JIS hue circle, in which colors are allocated successively in a 360-degree circle, into six equal portions of 60 degrees and calculating the values of the H components such that they may fall within the range of 0 to 1 in accordance with the six equal portions of the hue circle. In the hue circle, positions in the vicinity of approximately 30 to 40 degrees correspond to the flesh-color region.

In cases where the picture element value corresponding to zero degree in the hue circle, at which the value of the H component is equal to zero, is taken as red, in order to prevent the problems from occurring in that the H component has no value when the saturation is zero, i.e. R=G=B, small random values should preferably be given to the R, G, and B values of the original color image. Also, since the H components take endless values, as will be described later, the H components can be represented by using R, G, and B values, which are obtained from a reverse operation with the S and V components being taken as fixed values.

Since the H components take endless values, when the information representing the H components is fed into the neural network utilizing the line process, the conditions of Formula (3) are taken into consideration.

$f(\Delta H)=\Delta H$[rad]: when $\Delta H \leq \pi = 2\pi - \Delta H$ [rad]: when $\Delta H > \pi$ \quad (3)

Further, in this embodiment, as an aid in facilitating the separation of the region of flesh color, which is the color of a face, non-linear processing with a sigmoid function may be carried out on the H components, which are the hue components, such that the line process described later may become sensitive to flesh color. The non-linear processing with the sigmoid function is carried out with Formula (4).

$$H_{NEW} = g[k \cdot f(H - H_{ctr})] \quad (4)$$

wherein $H_{ctr}$ represents the hue value of flesh color, g(h) represents the sigmoid function of $1/(1-\exp(-\beta h))$, and k represents the fixed number for normalization.

How the non-linear processing with the sigmoid function is carried out will be described hereinbelow.

Figure 2:
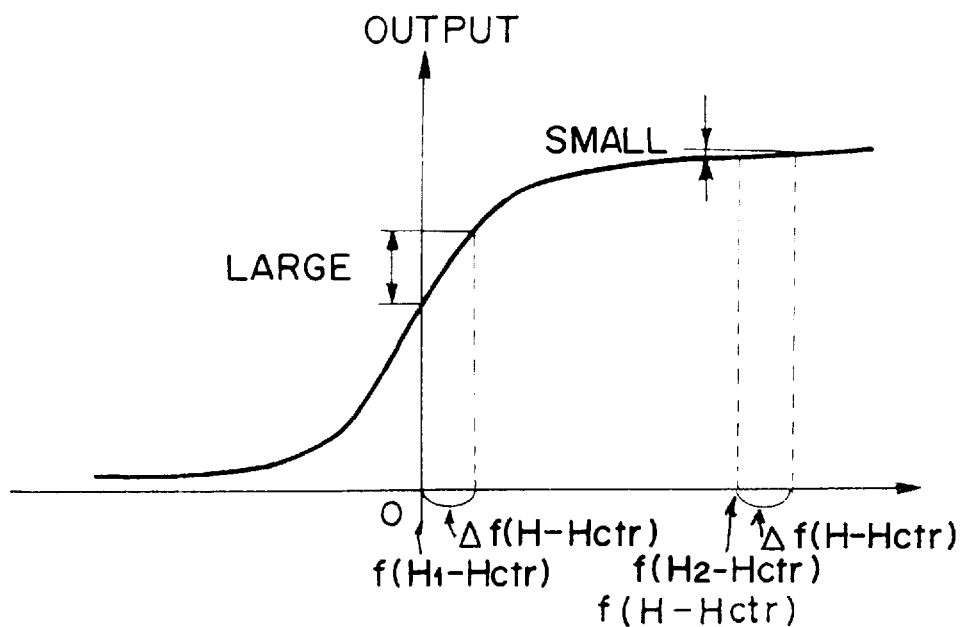
FIG. 2 is a graph showing a sigmoid function used in non-linear processing for emphasizing flesh color.

FIG. 2 is a graph showing a sigmoid function used in non-linear processing for emphasizing flesh color. In the graph illustrated in FIG. 2, the value obtained by processing the difference between the hue value H and the flesh-color hue value $H_{ctr}$ with a function f(h) is plotted on the horizontal axis, and the output of the sigmoid function is plotted on the vertical axis. When the hue value H is equal to the flesh-color hue value $H_{ctr}$, $f(H-H_{ctr})=0$. As for a color close to flesh color, the difference value $(H_1-H_{ctr})$ between the hue value $H_1$ and the flesh-color hue value $H_{ctr}$ becomes small. Therefore, when the difference value $(H_1-H_{ctr})$ is processed with the function f(h), $f(H_1-H_{ctr})$ has a value at a position close to 0. The inclination of the output of the sigmoid function in the vicinity of the position of 0 is comparatively large. As for a color far different from flesh color, the difference value $(H_2-H_{ctr})$ between the hue value $H_2$ and the flesh-color hue value $H_{ctr}$ becomes large. Therefore, when the difference value $(H_2-H_{ctr})$ is processed with the function f(h), $f(H_2-H_{ctr})$ has a value at a position remote from 0. The inclination of the output of the sigmoid function in the vicinity of the position remote from 0 is comparatively small. Accordingly, an input $\Delta g(h)$ to the line process, which will be described later, becomes large for a hue value close to flesh color. In cases where the non-linear processing with the sigmoid function is carried out on the H components, which are the hue components, the line process becomes sensitive to flesh color and can thus exhibit a reaction close to the reaction of human eyes.

Figure 3:
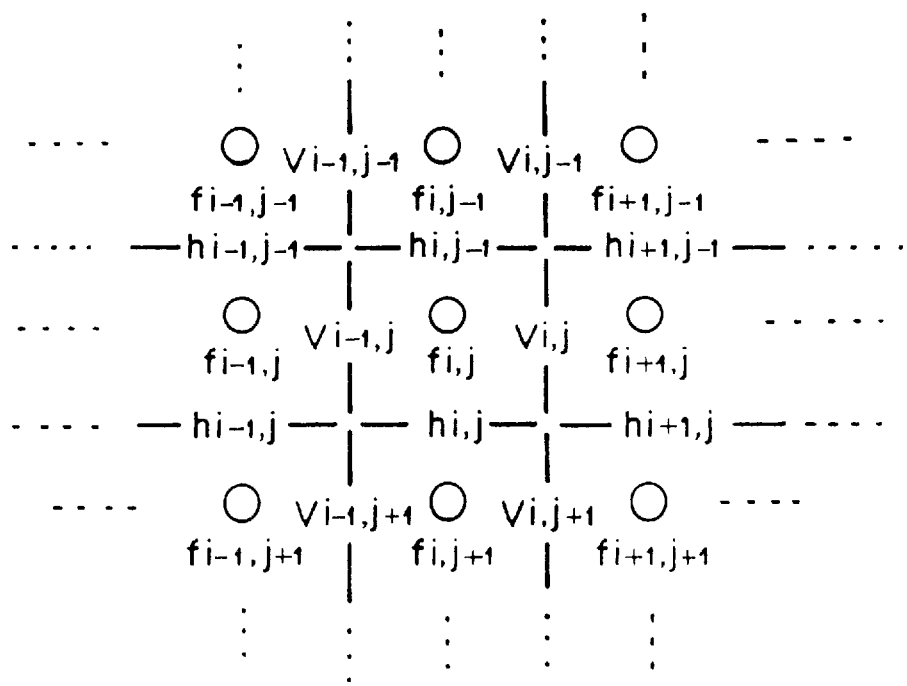
FIG. 3 is an explanatory view showing a neural network utilizing a line process.

How the energy function is defined and how the energy minimization is carried out by the neural network utilizing the line process will be described hereinbelow. FIG. 3 is an explanatory view showing a neural network utilizing a line process. As illustrated in FIG. 3, in cases where the input is an image, the neural network has three neurons $f_{i,j}$, $h_{i,j}$, and $v_{i,j}$ for each of picture elements of the image. The neuron $f_{i,j}$ represents the value of the picture element. The neurons $h_{i,j}$ and $v_{i,j}$ represent hidden functions, which are referred to as the line process and represent the presence or absence of discontinuity between the neurons $f_{i,j}$. Specifically, $f_{i,j}$ represents a change in intensity of the input value. Also, $h_{i,j}$ represents continuity or discontinuity of $f_{i,j}$ along the horizontal direction, and $v_{i,j}$ represents continuity or discontinuity of $f_{i,j}$ along the vertical direction.

The energy function of the entire system is defined by Formula (5) from the three variables $f_{i,j}$, $h_{i,j}$, and $v_{i,j}$.

$$E = E_I + E_D + E_V + E_P + E_C + E_L + E_G \quad (5)$$

$$E_I = \sum_{ij} [(f_{i,j+1} - f_{i,j})^2 (1 - h_{i,j}) + (f_{i+1,j} - f_{ij})^2 (1 - v_{i,j})]$$

$$E_D = C_D \sum_{ij} (f_{i,j} - d_{i,j})^2$$

-continued $$E_V = C_V \sum_{ij} [h_{ij}(1 - h_{i,j}) + v_{i,j}(1 - v_{i,j})]$$

$$E_P = C_P \sum_{ij} (h_{i,j} h_{i,j+1} + v_{i,j} v_{i+1,j})$$

$$E_C = C_C \sum_{ij} (h_{i,j} + v_{i,j})$$

$$E_L = C_L \sum_{ij} [h_{i,j}\{(1 - h_{i+1,j} - v_{i,j} - v_{i,j+1}) +$$

$$(1 - h_{i-1,j} - v_{i-1,j} - v_{i-1,j+1})\} +$$

$$v_{i,j}\{(1 - v_{i,j+1} - h_{i,j} - h_{i+1,j}) +$$

$$(1 - v_{i,j-1} - h_{i,j-1} - h_{i+1,j-1})\}]$$

$$E_G = C_G \sum_{ij} \left[ \int_0^{h_i} g_{i,j}^{-1}(h_{i,j}) d h_{i,j} + \int_0^{v_i} g_{i,j}^{-1}(v_{i,j}) d v_{i,j} \right]$$

g(): sigmoid function, d: input signal wherein $E_I$ represents the continuity of curved surface (depth) signal values, $E_D$ represents the reliability of the observed signal values (initial values), $E_V$ represents that the line process is directed to the corners of hypercube ($0_{or}1$), $E_p$ represents the conditions for the neighboring parallel line processes to become equal to 1, $E_C$ represents the conditions for the single line process to become equal to 1, $E_L$ represents the conditions for favoring the continuous line processes and penalizing both multiple-intersections and discontinuity, $E_G$ represents the conditions for the values of m and n in Formula (6) not to diverge, $C_D$, $C_V$, $C_C$, $C_L$ and $C_G$ represent the parameter values, and $d_{i,j}$ represents the initial value.

Also, the temporal rule of variables is defined by Formula (6).

$$\frac{df_{i,j}}{dt} = -\frac{\partial E}{\partial f_{i,j}} \quad (6)$$

$$\frac{dm_{i,j}}{dt} = -\frac{\partial E}{\partial h_{i,j}}$$

$$\frac{dn_{i,j}}{dt} = -\frac{\partial E}{\partial v_{i,j}}$$

wherein $$g(U_i) = \frac{1}{1 + e^{-2\lambda U_i}}$$

$h_{i,j} = g(m_{i,j})$ $v_{i,j} = g(n_{i,j})$ m, n: Internal state variables

Examples of the calculations of partial differentiation in Formula (6) are carried out with Formula (7).

$$\frac{\partial E_I}{\partial f_{i,j}} = \frac{\partial}{\partial f_{i,j}} \cdot [(\cdots + (f_{i,j} - f_{i,j-1})^2(1 - h_{i,j-1}) + \quad (7)$$

$$(f_{i,j+1} - f_{i,j})^2(1 - h_{i,j}) + \cdots\} +$$

$$\{\cdots + (f_{i,j} - f_{i-1,j})^2(1 - v_{i-1,j}) +$$

$$(f_{i+1,j} - f_{i,j})^2(1 - v_{i,j}) + \cdots\}]$$

$$= 2(f_{i,j} - f_{i,j-1})(1 - h_{i,j-1}) + (-2)(f_{i,j+1} - f_{i,j})(1 - h_{i,j}) +$$

$$2(f_{i,j} - f_{i-1,j})(1 - v_{i-1,j}) + (-2)(f_{i+1,j} - f_{i,j})(1 - v_{i,j})$$

$$\frac{\partial E_I}{\partial h_{i,j}} = -(f_{i,j+1} - f_{i,j})^2$$

$$\frac{\partial E_I}{\partial v_{i,j}} = -(f_{i+1,j} - f_{i,j})^2$$

The values of Formula (7) become small, i.e., take a value of 0 or close to 0 when the adjacent values $f_{i,j+1}$ and $f_{i,j}$ are approximately equal to each other, and when the adjacent values $f_{i+1,j}$ and $f_{i,j}$ are approximately equal to each other. Therefore, when energy $E_I$ is calculated with Formula (5a)

$$E_I = \sum_{i,j} [(f_{i,j+1} - f_{i,j})^2(1 - h_{i,j}) + (f_{i+1,j} - f_{i,j})^2(1 - v_{i,j})] \quad (5a)$$

in cases where $f_{i,j+1} \approx f_{i,j}$ $f_{i+1,j} \approx f_{i,j}$ energy $E_I$ becomes comparatively small, and the line processes $h_{i,j}$ and $v_{i,j}$ need not have a large value. Accordingly, $h_{i,j}$ and $v_{i,j}$ take comparatively small values.

In cases where there are large differences between the adjacent values $f_{i,j+1}$ and $f_{i,j}$ and between the adjacent values $f_{i+1,j}$ and $f_{i,j}$ i.e. in cases where there is a boundary between the adjacent values, the values of $(f_{i,j+1} - f_{i,j})^3$ and $(f_{i+1,j} - f_{i,j})^3$ become large. Therefore, in order for energy $E_I$ calculated with Formula (5a) to become small, it is necessary that $h_{i,j}$ or $v_{i,j}$ have a comparatively large value and the value of $1-h_{i,j}$ or the value of $1-v_{i,j}$ becomes comparatively small. Thus in cases where there is a large difference between the adjacent values $f_{i,j}$ and $f_{i,j+1}$ or between the adjacent values $f_{i,j}$ and $f_{i+1,j}$, the line processes $h_{i,j}$ and $v_{i,j}$ between the adjacent values have comparatively large values, and a boundary occurs between regions of different colors. In this embodiment, the parameter values are set to be values listed in Table 1 below.

TABLE 1

| $C_D$ | $C_V$ | $C_P$ | $C_C$ | $C_L$ | $C_G$ |
|---|---|---|---|---|---|
| $1.0 \times 10^{-4}$ | $0.5 \times 10^{-4}$ | $5.0 \times 10^{-4}$ | $1.0 \times 10^{-4}$ | $4.0 \times 10^{-4}$ | $0.5 \times 10^{-4}$ |

Figure 4A:
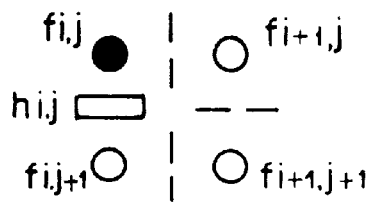
FIGS. 4A, 4B, 4C, and 4D are explanatory views showing conditions for the occurrence of a line process.
Figure 4B:
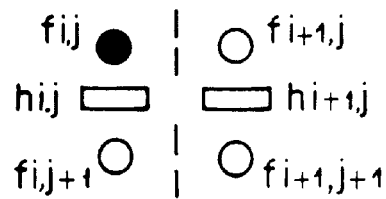
Figure 4C:
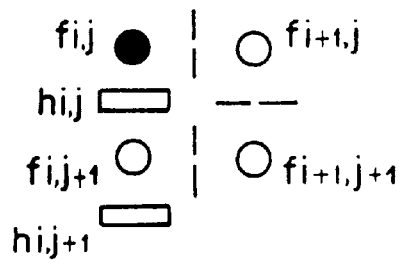
Figure 4D:
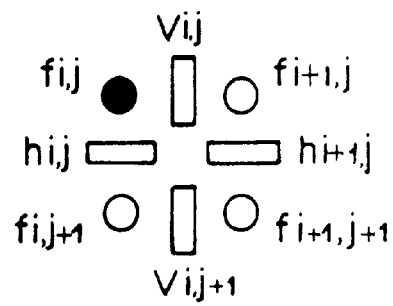

The conditions for the occurrence of the line process are determined from the coefficients. Specifically, the conditions for the occurrence of the line process, which is shown in FIG. 4A, are $E_P=0$, $E_c=0$, and $E_L=2C_L$. The conditions for the occurrence of the continuous line processes, which are shown in FIG. 4B, are $E_P=0$, $E_c=0$, and $E_L=C_L$. The conditions for the occurrence of the parallel line processes, which are shown in FIG. 4C, are $E_P=C_P$, $E_C=C_C$, and $E_L=2C_L$. The conditions for the occurrence of the line processes intersecting each other, which are shown in FIG. 4D, are $E_P=0$, $E_C=2C_C$, and $E_L=10C_L$.

The results obtained from the energy learning operations, in which the calculations for minimizing energy of the entire system are iterated and which are carried out with Formulas (5), (6), and (7), constitute a solution to the given input.

As a specific example, in cases where (a) the input is an image containing noise, the obtained $f_{i,j}$ at the minimum energy corresponds to a restored image. In cases where (b) the input is a lightness image, the obtained $h_{i,j}$ and $v_{i,j}$ at the minimum energy correspond to contour lines. Also, in cases where (c) the input is the surveying information concerning a mountain, or the like, the obtained $f_{i,j}$ at the minimum energy represents the height of each point presumed from the surveying point.

Thus this technique has an extensibility such that it can be applied to various inverse problems, depending upon what are allocated to the variables. Further, since the algorithm is carried out with local area limited calculations, the technique can be easily carried out with a parallel processing hardware function, which utilizes light, or the like, and the technique can be carried out through quick processing.

Figure 5A:
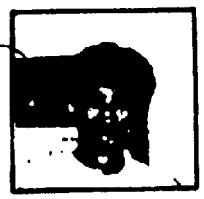
FIGS. 5A, 5B, and 5C are explanatory views showing input images used in the embodiment of the method for separating a color region in accordance with the present invention.
Figure 5B:
Figure 5C:

In experiments carried out with this embodiment, images, in which a face pattern is embedded, were taken as the input images. Also, the input images were selected from such images that the separation of a face pattern and a background from each other was considered to be difficult with the conventional method taking the lightness information as the input or utilizing the color information. Specifically, as illustrated in FIG. 5A, an image 1, in which a clear contour 10 is present in the background, was selected. Also, as illustrated in FIG. 5B, an image 2, in which a contour is apt to occur in the region inside of the face pattern due to light, or the like, was selected. Further, as illustrated in FIG. 5C, an image 3, in which a pattern 11 of a material constituted of a color similar to flesh color is located around the face pattern, was selected. In the experiments, calculations were carried out with Formulas (5) and (6), the newly obtained $f_{i,j}$, $h_{i,j}$, and $v_{i,j}$ were employed as the inputs to the next calculations. Thus the calculations were iterated 150 times, and the energy minimization was thereby carried out.

Figure 6A:
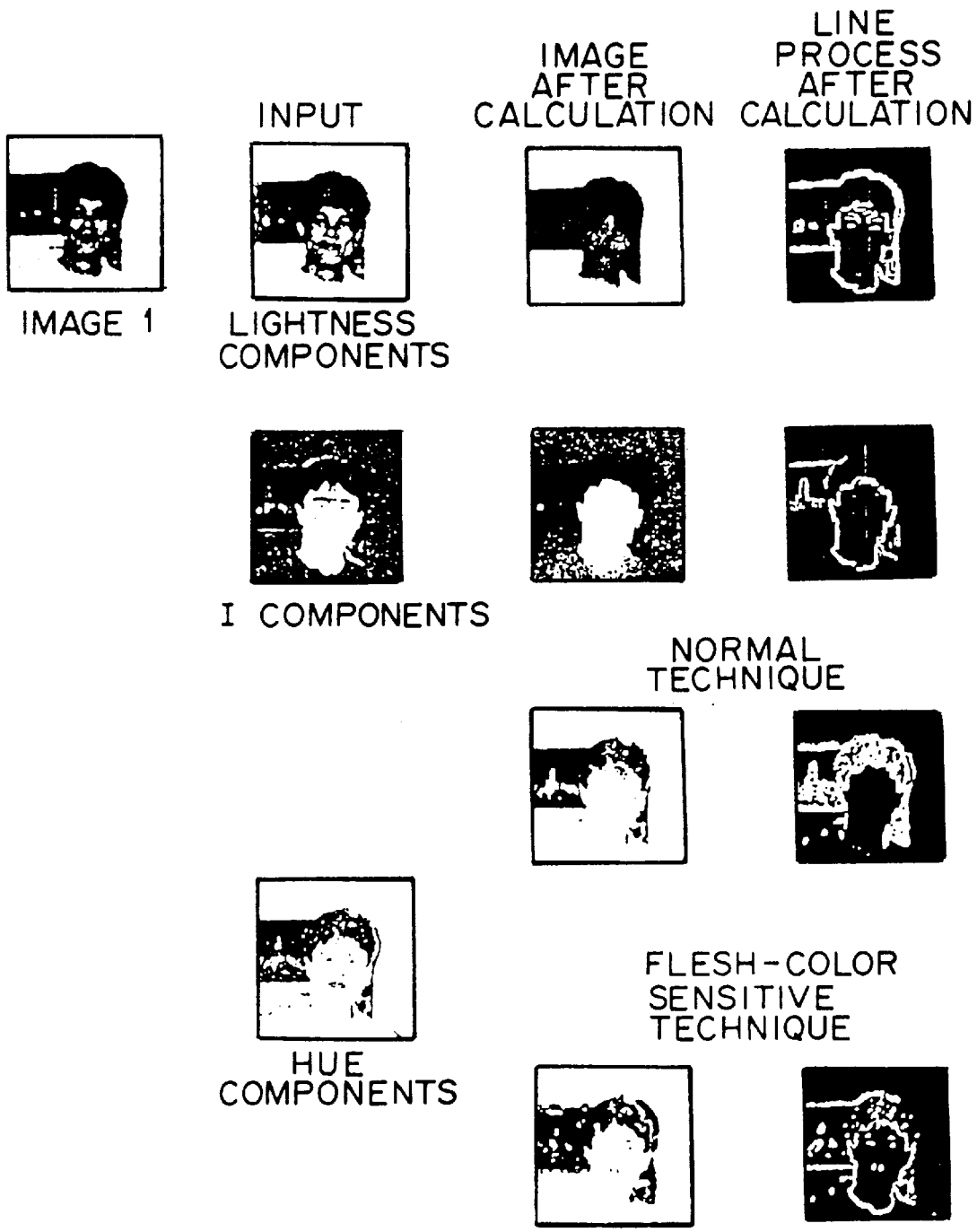
FIG. 6A is an explanatory view showing the results of calculations, which are obtained when an image 1 is taken as an input image.
Figure 7:
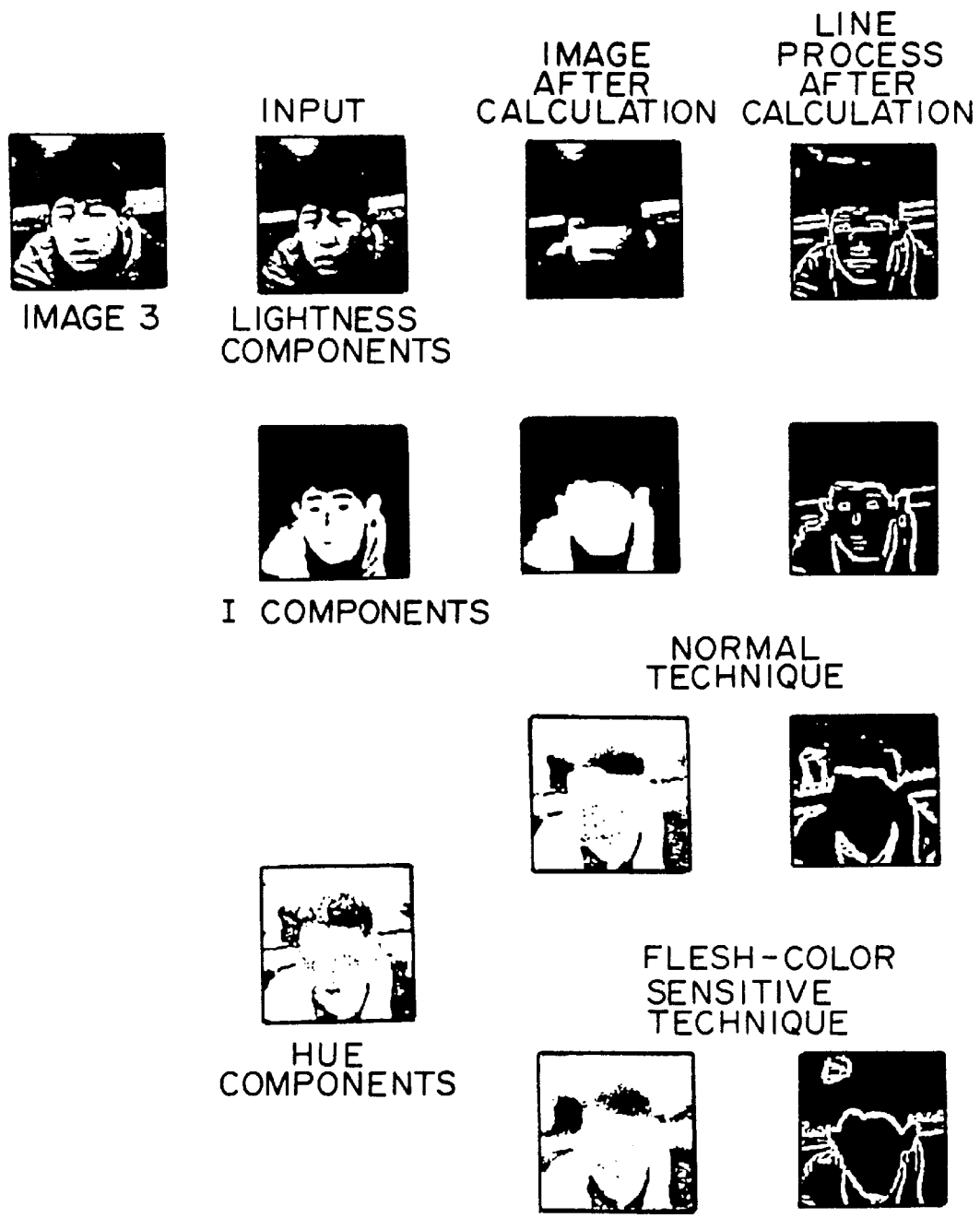
FIG. 7 is an explanatory view showing the results of calculations, which are obtained when an image 3 is taken as an input image.

FIGS. 6A, 6B and FIG. 7 show the results obtained by presenting the images 1, 2, and 3 shown in FIGS. 5A, 5B, and 5C to the neural network utilizing the line process in the embodiment of the method for separating a color region in accordance with the present invention.

FIG. 6A is an explanatory view showing the results of calculations for energy minimization, which are obtained when the image 1 shown in FIG. 5A is taken as the input image. The top row in FIG. 6A shows the results of calculations, which are obtained when the gray level image information constituted of only the lightness information concerning the image 1 is taken as the input in accordance with the conventional line process technique. As illustrated at the top row in FIG. 6A, the contour 10, which is located in the background in the image 1, is amalgamated with the contours of the face and head patterns, and only the face pattern region cannot be separated accurately from the image 1.

The second row in FIG. 6A shows the results of calculations, which are obtained when the I components of the image are taken as the input. As illustrated at the second row in FIG. 6A, the line processes obtained from the calculations accurately can accurately separate the face pattern region and the contour 10, which is located in the background, in the image 1 from each other.

The third and fourth rows in FIG. 6A show the results of calculations, which are obtained when the hue components of the image are taken as the input. The results shown at the third row in FIG. 6A are obtained with the normal type of neural network utilizing the line process. The results shown at the fourth row in FIG. 6A are obtained with the neural network utilizing the line process, which has been rendered sensitive to flesh color. As illustrated at the third and fourth rows in FIG. 6A, the face pattern can be separated accurately as a single region from the image.

FIG. 6B is an explanatory view showing the results of calculations for energy minimization, which are obtained when the image 2 shown in FIG. 5B is taken as the input image. The top row in FIG. 6B shows the results of calculations, which are obtained when the gray level image information constituted of only the lightness information concerning the image 2 is taken as the input in accordance with the conventional line process technique. As illustrated at the top row in FIG. 6B, the portions within the face pattern in the image 2, which portions reflected light during the image recording operation, appear as the line processes, and only the face pattern region cannot be separated accurately from the image 1.

The second row in FIG. 6B shows the results of calculations, which are obtained when the I components of the image are taken as the input. As illustrated at the second row in FIG. 6B, the contours located in the background in the image 2 can be removed. However, with the line processes obtained from the calculations, the portions within the face pattern in the image 2, which portions reflected light during the image recording operation, appear as the line processes, and only the face pattern region cannot be separated accurately from the image 1.

The third and fourth rows in FIG. 6B show the results of calculations, which are obtained when the hue components of the image are taken as the input. The results shown at the third row in FIG. 6B are obtained with the normal type of neural network utilizing the line process. As illustrated at the third row in FIG. 6B, the portions within the face pattern in the image 2, which portions reflected light during the image recording operation, do not appear as the line processes, and only the face pattern region can be separated comparatively accurately from the image 2. The results shown at the fourth row in FIG. 6B are obtained with the neural network utilizing the line process, which has been rendered sensitive to flesh color. As illustrated at the fourth row in FIG. 6B, the line processes occur more clearly and accurately, and the face pattern region can be separated more accurately from the image.

FIG. 7 is an explanatory view showing the results of calculations for energy minimization, which are obtained when the image 3 shown in FIG. 5C is taken as the input image.

The top row in FIG. 7 shows the results of calculations, which are obtained when the gray level image information constituted of only the lightness information concerning the image 3 is taken as the input in accordance with the conventional line process technique. As illustrated at the top row in FIG. 7, the pattern 11 of a material such as a handrail, which is constituted of a color similar to flesh color and is located around the face pattern in the image 3, a pattern of clothes located around the face pattern in the image 3, or the portions within the face pattern in the image 3, which portions reflected light during the image recording operation, appear as the line processes, and only the face pattern region cannot be separated accurately from the image 3.

The second row in FIG. 7 shows the results of calculations, which are obtained when the I components of the image are taken as the input. As illustrated at the second row in FIG. 7, the adverse effects of the contours, which are located in the background in the image 3, and the portions within the face pattern in the image 3, which portions reflected light during the image recording operation, can be rendered small. However, only the face pattern region cannot be separated accurately from the image 3.

The third and fourth rows in FIG. 7 show the results of calculations, which are obtained when the hue components of the image are taken as the input. The results shown at the third row in FIG. 7 are obtained with the normal type of neural network utilizing the line process. As illustrated at the third row in FIG. 7, the portions within the face pattern in the image 3, which portions reflected light during the image recording operation, do not appear as the line processes. However, the face pattern and the pattern 11 of a material located around the face pattern are amalgamated, and only the face pattern region cannot be separated accurately from the image 3. The results shown at the fourth row in FIG. 7 are obtained with the neural network utilizing the line process, which has been rendered sensitive to flesh color. As illustrated at the fourth row in FIG. 7, the line processes occur clearly on the contours of the face pattern, and the face pattern region can be separated accurately from the image.

In the embodiment described above, the flesh-color face pattern is separated from the input image. However, the method for separating a color region in accordance with the present invention is not limited to the aforesaid embodiment, and a region of color other than flesh color may be separated from the input image. In such cases, though the YIQ base cannot be applied, the given image may be converted to, for example, the HVS base, and the calculations may be carried out by constituting the neural network utilizing the line process such that it may be sensitive to the H components of the desired color.

What is claimed is:

1. A method for separating regions of a color image which image includes a desired flesh color region comprising at least three colors and other regions, comprising the steps of:

calculating color component values representing color components of said at least three colors of the image of said desired flesh color region, said desired flesh color region being a flesh color;

producing an emphasized image which, in comparison with said color image, has an expanded dynamic range at the frequencies for said colors of said desired flesh color region, said emphasized image being produced by emphasizing said color components for said desired flesh color region by using a non-linear function performed in accordance with a sigmoid function;

carrying out energy minimization on said emphasized image, after using said non-linear function, such that calculations of an update rule for minimizing energy are iterated, in accordance with an energy function defined by:

said color component values, and a line process representing the presence or absence of continuity of said color component values in the image;

extracting a contour of the color region, the contour being represented by the line process and being obtained from said energy minimization; and thereby separating the desired flesh color region from the other regions.

* * * * *